(No Model.)
J. W. YATES.
FENCE STAY.
No. 461,923.                    Patented Oct. 27, 1891.
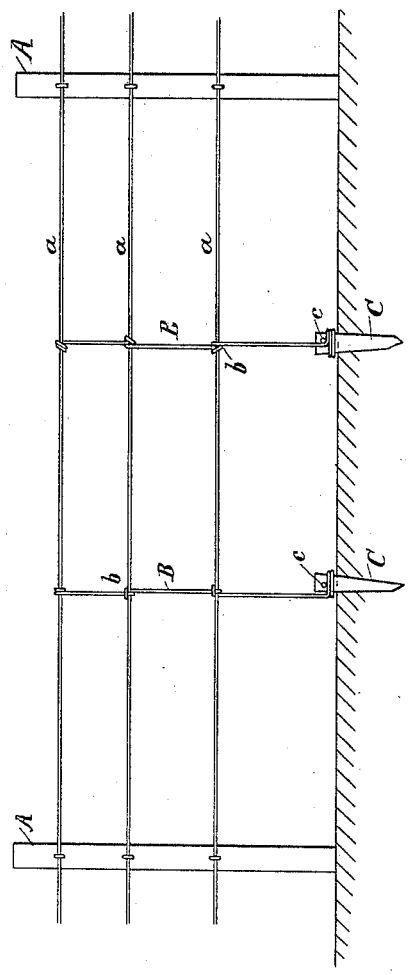
WITNESSES
INVENTOR
John W. Yates.
by Herbert W. T. Jenner. Attorney

UNITED STATES PATENT OFFICE.

JOHN W. YATES, OF GENEVA, NEBRASKA.

FENCE-STAY.

SPECIFICATION forming part of Letters Patent No. 461,923, dated October 27, 1891.

Application filed April 9, 1891. Serial No. 388,225. (No model.)

*To all whom it may concern:*

Be it known that I, JOHN W. YATES, a citi-citizen of the United States, residing at Geneva, in the county of Fillmore and State of Nebraska, have invented certain new and useful Improvements in Fence-Stays; and I do hereby declare the following to be a full, clear, and exact description of the invention, such as will enable others skilled in the art to which it appertains to make and use the same.

This invention relates to stays for wire fences; and it consists in the novel construction and combination of the parts hereinafter fully described and claimed.

In the drawings, Figure 1 is a front view of a portion of a wire fence provided with stays according to this invention, and Fig. 2 is an end view of one of the stays.

A are the fence-posts, and $a$ are the parallel fence-wires, which may be barbed or plain wires.

The stays B each consist or a piece of wire which is secured to the top wire of the fence.
The wire is passed once around each remaining fence-wire and half around itself at the fence-wire, and the lower end of each wire is wound around a stake C, which is driven into the ground. A nail $c$ is inserted crosswise through the top of each stake to prevent the wire from slipping off. The loops $b$ in the stays at the fence-wires lock the stays and fence-wires together, and the fence-wires are kept at the same distance apart.

The fence-wires prevent the large stock from straying in the usual manner, and the stays prevent small stock, such as sheep and pigs, from lifting the lower wires of the fence and passing beneath them.

What I claim is—

1. The combination, with a fence provided with horizontal parallel wires, of a fence-stay consisting of a vertical wire secured to the top wire of the fence and wound once around each of the remaining wires of the fence and half around itself at the said wires and having its lower end secured to the ground, substantially as described and shown.

2. The combination, with a fence provided with horizontal parallel wires, of a fence-stay consisting of a vertical wire secured to the top wire of the fence and wound once around each of the remaining wires of the fence and half around itself at the said wires, a stake driven into the ground and having the lower end of the stay wound around it, and a nail passed transversely through the stake to retain the wire, substantially as described and shown.

In testimony whereof I affix my signature in presence of two witnesses.

JOHN W. YATES.

Witnesses:
   T. B. DONISTHORPE,
   C. A. JORDAN.